(12) United States Patent
Beckmann et al.

(10) Patent No.: US 7,684,811 B2
(45) Date of Patent: Mar. 23, 2010

(54) METHOD FOR TRANSMITTING SHORT MESSAGES

(75) Inventors: Mark Beckmann, Braunschweig (DE); Siegfried Bär, Unterschleissheim (DE); Thomas Gottschalk, Berlin (DE); Martin Hans, Hildesheim (DE); Frank Kowalewski, Salzgitter, DE (US); Josef Laumen, Hildesheim (DE); Frank Schange, Hildesheim (DE); Gunnar Schmidt, Wolfenbüttel (DE)

(73) Assignee: Siemens Aktiengesellschaft, Munich (DE)

( * ) Notice: Subject to any disclaimer, the term of this patent is extended or adjusted under 35 U.S.C. 154(b) by 610 days.

(21) Appl. No.: 10/312,271
(22) PCT Filed: Jun. 20, 2001
(86) PCT No.: PCT/DE01/02289
§ 371 (c)(1), (2), (4) Date: Apr. 7, 2005
(87) PCT Pub. No.: WO03/066239
PCT Pub. Date: Aug. 14, 2003

(65) Prior Publication Data
US 2006/0120367 A1 Jun. 8, 2006

(30) Foreign Application Priority Data
Jun. 20, 2000 (DE) .................. 100 30 272

(51) Int. Cl.
H04W 4/00 (2009.01)
(52) U.S. Cl. ............ 455/466; 455/458; 455/412.1; 370/392; 370/352; 370/316; 340/7.25
(58) Field of Classification Search ........... 455/466, 455/412.1, 458; 340/7.46, 7.48, 7.22, 825.52; 379/88.22; 370/474, 390, 432; 709/230
See application file for complete search history.

(56) References Cited

U.S. PATENT DOCUMENTS

| 4,369,443 A | * | 1/1983 | Giallanza et al. | 340/7.46 |
| 4,873,519 A | * | 10/1989 | Matai et al. | 340/7.46 |
| 5,577,103 A | * | 11/1996 | Foti | 455/412.1 |
| 5,635,918 A | * | 6/1997 | Tett | 340/7.29 |

(Continued)

FOREIGN PATENT DOCUMENTS

EP 300350 1/1989

(Continued)

OTHER PUBLICATIONS

ETSI: Universal Mobile Telecommunications System (UMTS): Technical realization of the Short Message Service (SMS), Jan. 2000.

*Primary Examiner*—Sharad Rampuria
(74) *Attorney, Agent, or Firm*—King & Spalding L.L.P.

(57) ABSTRACT

A method is provided for transmitting a short message in a telecommunication network to a number of communication stations, wherein address data for the transmission of the short message to more than one communication station are transmitted with a short message, wherein a first header information item is transmitted with a number of data fields in the data section of the short message, each data field including the address data of at least one communication station, and in the second header information item, which is arranged preceding the first header information item, the address data of a first communication station or the network unit are transmitted.

19 Claims, 5 Drawing Sheets

U.S. PATENT DOCUMENTS

| | | | | |
|---|---|---|---|---|
| 5,652,783 | A * | 7/1997 | Keba et al. | 370/313 |
| 5,705,995 | A * | 1/1998 | Laflin et al. | 340/7.48 |
| 5,719,918 | A * | 2/1998 | Serbetciouglu et al. | 380/271 |
| 5,742,905 | A * | 4/1998 | Pepe et al. | 455/461 |
| 5,794,142 | A * | 8/1998 | Vanttila et al. | 455/419 |
| 5,920,822 | A * | 7/1999 | Houde et al. | 455/466 |
| 6,097,961 | A * | 8/2000 | Alanara et al. | 455/466 |
| 6,175,743 | B1 * | 1/2001 | Alperovich et al. | 455/466 |
| 6,185,208 | B1 * | 2/2001 | Liao | 370/392 |
| 6,226,686 | B1 * | 5/2001 | Rothschild et al. | 709/245 |
| 6,275,477 | B1 * | 8/2001 | Trompower et al. | 370/313 |
| 6,310,558 | B1 * | 10/2001 | Minami | 340/825.52 |
| 6,424,841 | B1 * | 7/2002 | Gustafsson | 455/466 |
| 6,597,918 | B1 * | 7/2003 | Kim | 455/466 |
| 6,636,733 | B1 * | 10/2003 | Helferich | 455/412.2 |
| 6,807,411 | B1 * | 10/2004 | De Kermadec | 455/412.1 |
| 6,920,331 | B1 * | 7/2005 | Sim et al. | 455/466 |
| 6,971,064 | B2 * | 11/2005 | Chien et al. | 715/758 |
| 7,042,886 | B2 * | 5/2006 | Ben Nun | 370/397 |
| 7,181,231 | B2 * | 2/2007 | Le Bodic et al. | 455/466 |
| 7,333,822 | B2 * | 2/2008 | Laumen et al. | 455/466 |
| 7,366,529 | B2 * | 4/2008 | Alanara et al. | 455/466 |
| 2004/0122964 | A1 * | 6/2004 | Teh | 709/230 |
| 2004/0142710 | A1 * | 7/2004 | Liang | 455/466 |
| 2004/0166842 | A1 * | 8/2004 | Malizia, Jr. | 455/426.1 |
| 2005/0259604 | A1 * | 11/2005 | Salmi | 370/310 |

FOREIGN PATENT DOCUMENTS

| | | |
|---|---|---|
| GB | 2291523 | 1/1996 |
| GB | 2317073 | 3/1998 |
| JP | 10210067 | 8/1998 |
| WO | WO 94/09599 | 4/1994 |

* cited by examiner

METHOD FOR TRANSMITTING SHORT MESSAGES

BACKGROUND OF THE INVENTION

The present invention relates to a method for transmitting a short message in a telecommunication network to a number of communication stations, the short message including a second header information item and a data section.

Methods for transmitting short messages are known, for example, for the GSM (Global System for Mobile Communications) mobile radio network and are implemented there as SMS (Short Message Service). In the SMS short message service, only a single receiver can be specified for sending out a short message. If the same short message is also to be sent out to other receivers, it must be sent out several times by the sender.

From WO99/57927, a method for delivering an SMS short message in a mobile radio network is known in which the respective SMS short message has a "header"; i.e., a head section with an additional group identification code before the actual message section. In principle, this SMS short message is transmitted via a broadcast radio channel from the base station of a radio cell to all mobile terminals staying there. The respective mobile terminal has a memory such as, e.g., a SIM (Subscriber Identity Module) card on which the identification codes for the groups to which this terminal belongs are stored as a list. It is only in the case where the respective mobile terminal finds by a comparison that the group identification code of the received SMS short message corresponds to the stored code identification group that the SMS message is displayed at all on the terminal. In this manner, the respective SMS message is transmitted individually from the base station in the respective radio cell to each mobile subscriber device staying there and selective reception is only carried out in each individual subscriber device itself with the aid of the group identification code comparison.

To be able to distribute the same data packet starting from a computer of a first network to a multiplicity of computers of another network while saving network loading, instead of the actual destination addresses of the destination computers, these destination addresses are identified as "1.1, 1.2, y.z" in a section of the preceding packet header field of the data packet in JP10 210067; i.e., they are only described by continuous numbering of the destination computers and not by their actual address data. In the actual data section of the data packet, no destination addresses are provided.

In the routing method of EP 0 300 350, a number of function commands are transmitted in a communication message, starting from a transmitting terminal which is connected to a first bus system, via a gateway only to one single destination terminal which is connected to a second bus system. In the communication message, separate header and data fields follow one another, the header fields only being allocated transmit and receive addresses and the data fields being allocated exclusively function commands.

SUMMARY OF THE INVENTION

The present invention is directed toward a method of how a short message can be distributed to a number of communication stations in a simple and expenditure-saving manner. This object is achieved by the method according to the present invention, of the type initially mentioned, in that address data for the transmission of the short message to more than one communication station are transmitted with a short message, in that a first header information item is transmitted with a number of data fields in the data section of this short message which data fields include the address data of at least one communication station, and in the second header information item, which is arranged preceding the first header information item, address data of a first communication station or of a network unit are transmitted.

By comparison, the method for transmitting short messages according to the present invention, has the advantage that address data for transmitting the short message to more than one communication station are transmitted with a short message. In this manner, the short message can be sent simultaneously to a number of communication stations or receivers so that time and effort is saved by the sender.

It is particularly advantageous that exactly one signaling identification data field is transmitted with the first header information item for a number of destination address data fields. In this manner, the volume of data used for the first header information item is reduced in the data section so that a greater data capacity is available for the useful data in the short message.

Additional features and advantages of the present invention are described in, and will be apparent from, the following Detailed Description of the Invention and the Figures.

DETAILED DESCRIPTION OF THE INVENTION

Figure 1:
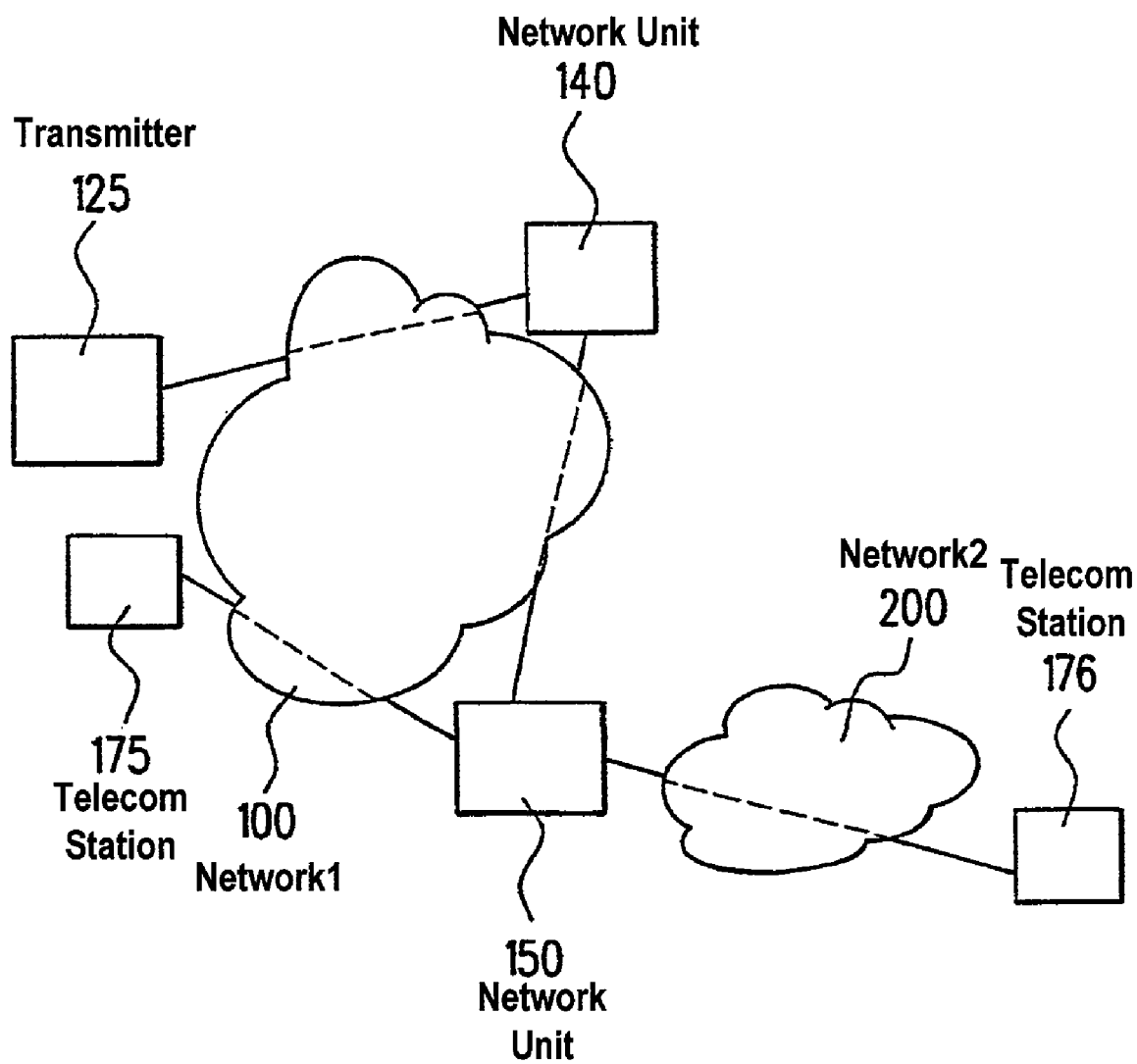
FIG. 1 shows a block diagram for the transmission of short messages via a first telecommunication network and a second telecommunication network.

In FIG. 1, 125 designates a transmitter which transmits a short message to a first network unit 140 via a first telecommunication network 100. The first network unit 140 forwards the short message via the first telecommunication network 100 to a second network unit 150 which represents both a network unit of the first telecommunication network 100 and a network unit of a second telecommunication network 200. From the second network unit 150, the short message can be transmitted via the first telecommunication network 100 to a first telecommunication station 175, on the one hand, and via the second telecommunication network 200 to a second communication station 176.

According to FIG. 1, the first network unit 140 and the second network unit 150 are constructed as two separate units but they can be integrated into one common unit.

Figure 2:
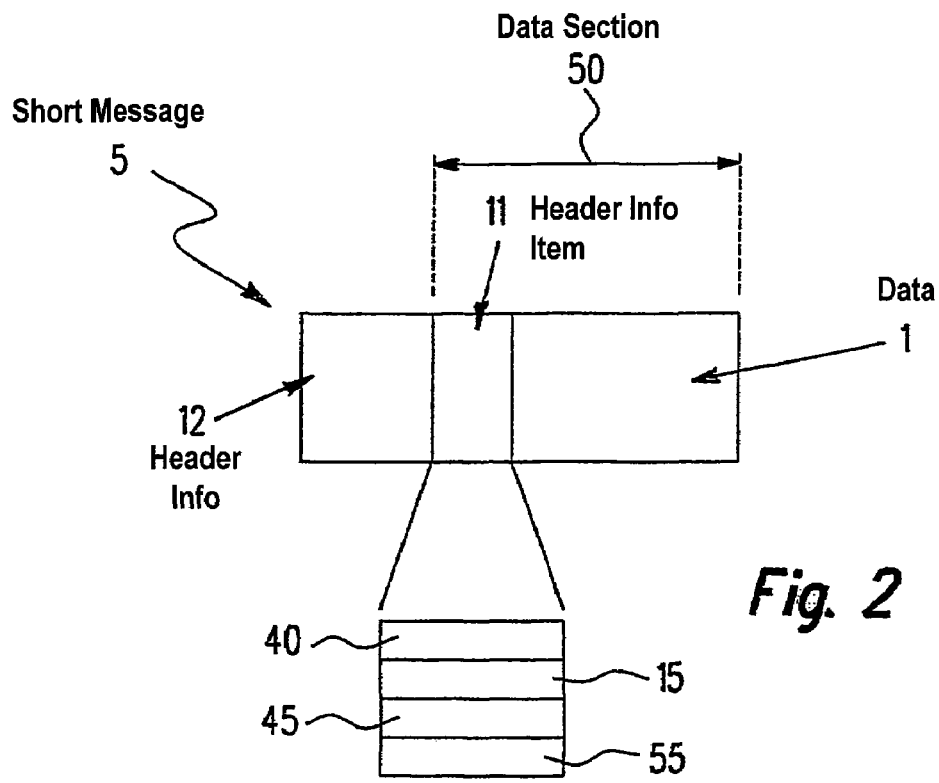
FIG. 2 shows the basic structure of a short message.

In FIG. 2, 5 designates a short message. The short message 5 is generated by the transmitter 125 of the first telecommunication network 100 and, as described, transmitted via the first network unit 140 of the first telecommunication network 100 to the second network unit 150 via the first telecommunication network 100. For this purpose, a so-called short message service is set up in the first telecommunication network 100 and in the second telecommunication network 200 for transmitting such short messages 5. Such a short message service is in existence, for example, in a telecommunication network constructed as mobile radio network. By way of example, it is to be assumed in the text which follows that the first telecommunication network 100 and the second telecommunication network 200 are in each case constructed as mobile radio network. Such a mobile radio network can be, for example, a mobile radio network according to the GSM (Global System for Mobile Communications) Standard or according to the UMTS (Universal Mobile Telecommunications System) Standard. In the GSM mobile radio network, the so-called SMS (Short Message Service) is specified which provides the sending of SMS short messages between a transmitter and a receiver, the SMS short messages being restricted to text messages of a maximum text length of, at present, 160 characters. If larger text messages are to be transmitted, the SMS short message service provides the possibility of concatenating a number of SMS short messages; i.e., the short message to be transmitted is distributed over a number of SMS short messages. In principle, the short message 5 shown in FIG. 2 includes a second header information item 12 and a data section 50. The second header information item 12 includes signaling entries and a first destination address for the short message 5 to be sent and, respectively, a source address for the short message 5 to be received. The first destination address identifies the second network unit 150 as receiver of the short message 5 in the first telecommunication network 100 and the source address identifies the transmitter 125 of the short message 5 in the first telecommunication network 100. The data section 50 includes the message actually to be transmitted, and thus the so-called useful data which are identified by the reference symbol 1 in FIG. 2. In the SMS short message service, the source address and, respectively, the first destination address identified via a so-called MSISDN (Mobile Subscriber Integrated Services Digital Network) number according to the publications "Technical Realisation of the Short Message Service (SMS); Point to Point (PP)" GSM 03.40 V 7.1.0, (1998-11) and "Technical Realisation of the Short Message Service (SMS); Point to Point (PP)" 3G23.040 V 3.2.0 (1999-10). When the short message 5 is transmitted in the first telecommunication network 100, the first network unit 140, to which the short message 5 was initially transmitted via the first telecommunication network 100 as predetermined, addresses the second network unit 150 via the first destination address and replaces it with the source address of the transmitter 125 in the second header information item 12. According to the standard, the second header information item 12 thus contains exactly one source address or exactly one first destination address.

According to FIG. 2, the short message 5 includes a first header information item 11 which is arranged preceding the useful data 1 in the data section 50 of the short message 5. In the SMS short message service, the first header information item 11 is called "User Data Header".

The presence of the first header information item 11 in the data section 50 is indicated by a corresponding signaling entry in the second header information item 12. In the SMS short message service, various types of user data header are specified in accordance with the publications "Technical Realisation of the Short Message Service (SMS); Point-to-Point (PP)". They are distinguished by a first signaling identification data field 15 in the first header information item 11 according to FIG. 2, FIG. 2 already showing the structure of the first header information item 11 in principle.

The useful data 1 transmitted in the data section 50 of the short message 5 will now be transmitted in each case in the form of a short message to a number of communication stations, to the first communication station 175 and to the second communication station 176 in this example. The signaling entry in the second header information item 12 additionally specifies that the useful data 1 contained in the short message 5 are to be transmitted to a number of communication stations. This signaling is done in that the first header information item 11 in the second data section 50 is referred to in the second header information item 12. Using the first destination address in the second header information item 12, the short message 5 is first transmitted, as described, via the first telecommunication network 100 to the first network unit 140 which can be constructed as service center of a network provider of the first telecommunication network 100. The first network unit 140 evaluates the first destination address in the second header information item 12 and sends the short message 5 to the second network unit 150 associated with this first destination address. Using the evaluation of the signaling entry in the second header information item 12, the second network unit 150 detects the presence of the first header information item 11 in the data section 50. The second network unit 150 has the task of evaluating this first header information item 11. This first header information item 11 contains the destination addresses of the communication stations 175, 176 to which the useful data 1 of the short message 5 are in each case to be transmitted again in a separate short message. In this process, these communication stations 175, 176 can be reached via the first telecommunication network 100, and thus the same telecommunication network as the transmitter 125, or via other telecommunication networks such as, for example, the second telecommunication network 200. According to FIG. 1, the first telecommunication station 175 is reached via the first telecommunication network and the second telecommunication station 176 is reached via the second telecommunication network 200 in this example. The second network unit 150 extracts the receiver addresses of these telecommunication stations 175, 176 from the first header information item 11. Depending on the range of functions of the second network unit 150, this unit can transmit the useful data 1 in the form of in each case a short message directly to the individual telecommunication stations 175, 176, either via the first telecommunication network 100 or via the second telecommunication network 200. Otherwise, the second network unit 150 causes the first network unit 140 to send the useful data to the communication stations 175, 176 with the addresses, extracted from the first header information item 11, of the telecommunication stations 175, 176. The sending to the second communication station 176 via the second telecommunication network 200 can again take place via the second network unit 150 since the latter is also a party in the second telecommunication network 200, in contrast to the first network unit 140. The corresponding short message can be sent to the first communication station 175 from the first network unit 140 directly via the first telecommunication network 100, which is not shown in FIG. 1 for reasons of clarity.

Figure 3:
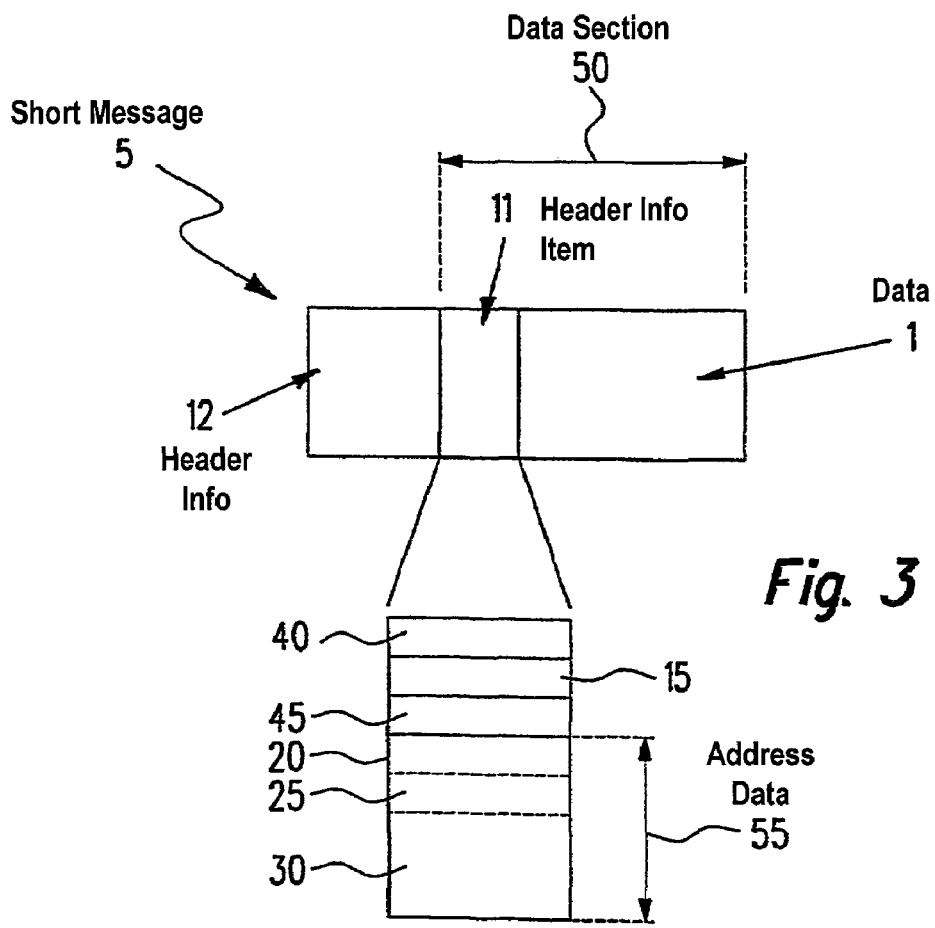
FIG. 3 shows the structure of a first header information item with data fields for the transmission of address data.

With the data section 50, a number of data fields 20, 25, 30 according to FIG. 3 are now transmitted which include address data for the transmission of the useful data 1 to the first communication station 175 and to the second communication station 176. After evaluation of these address data in the second network unit 150, the useful data 1 can then be forwarded to the first communication station 175 and the second communication station 176 in the manner described. For this purpose, the second network unit 150 must be informed about how these data fields 20, 25, 30 are structured or whether there are such data fields 20, 25, 30 at all in the data field 50. This is done via a signaling identification data field 15 in the first header information item 11. There, a so-called identifier specifies the manner in which the address data are present in the data section 50 and thus also signals that the data fields 20, 25, 30 exist at all. For example, the identifier can specify that the data fields 20, 25, 30 in the data section 50 include a number of addresses of communication stations for sending out the useful data 1.

According to FIG. 2 and FIG. 3, the signaling identification data field 15 of the first header information item 11 is preceded by a first length data field 40 which specifies the length UDHL (User Data Header Length) of the first header information item 11. The first length data field 40 is then followed by the signaling identification data field 15, already described, with the identifier IEI (Information item Element Identifier), which, in this case, specifies that the data fields 20, 25, 30 include address data for a number of communication stations 175, 176. The signaling identification data field 15 is followed by a second length data field 45 which specifies the length IEIDL (Information item Element Identifier Data Length) of the actual address data 55 according to FIG. 2 in the first header information item 11. According to FIG. 3, the actual address data 55 are formed by the data fields 20, 25, 30. The addresses of the communication stations 175, 176 can be coded, for example, in accordance with the publications "Technical Realisation of the Short Message Service (SMS); Point-to-Point (PP)". The address data 55 of the first header information item 11 of the short message 5 are in each case formed by the three data fields 20, 25, 30, as described, a first data field 20, as length data field, specifying the length of the address, which can be present, for example, in the form of a telephone number, in half-octets, or so-called semioctets which, when the address is structured as telephone number, corresponds to the number of digits in the telephone number. The first data field 20 is already shown in FIG. 3. It is followed by a second data field 25 which specifies the type of address as is specified, for example, in the standard ITU-T E.164/ E163 or ITU-T X.121. The second data field 25 of the address data 55 in FIG. 3 is then followed by a third data field 30 which contains the address or, respectively, the telephone number itself. The first header information item 11 can also include a number of identical or different types of user data header according to the publications "Technical Realisation of the Short Message Service (SMS); Point-to-Point (PP)". The arrangement, described according to FIG. 2 and FIG. 3, in the first header information item 11, consisting of the first length data field 40, the signaling identification data field 15, the second length data field 45 and the address data 55, may be repeated several times in the same order, as shown in FIG. 4.

In the text which follows, an example of the structure of the first header information item 11 is described. Firstly, the second header information item 12 contains the signaling entry TP-UDHI (Transfer Protocol User Data Header Identification) which specifies whether the first header information item 11, and thus a number of address data 55, 56, 57, are present in the short message 5. If this is the case, TP-UDHI is set to 1 and, if not, TP-UDHI is set to 0. The first header information item 11 can then be structured, for example, as shown in FIG. 4.

In the first length data field 40, the length UDHL of the first header information item 11 is set to 1E in the hexadecimal system. In the signaling identification data field 15, which will be called the first signaling identification data field in the text which follows, the identifier IEI is set to 25 in the hexadecimal system and references with this value the addressing to a number of addresses of communication stations 175, 176, as described. In the second length data field 45, the length IEIDL for the address data 55, which will also be called first address data in the text which follows, and thus the length of the data fields 20, 25, 30 of the first address data 55 of the first header information item 11 is set to 8 in the hexadecimal system.

Figure 4:
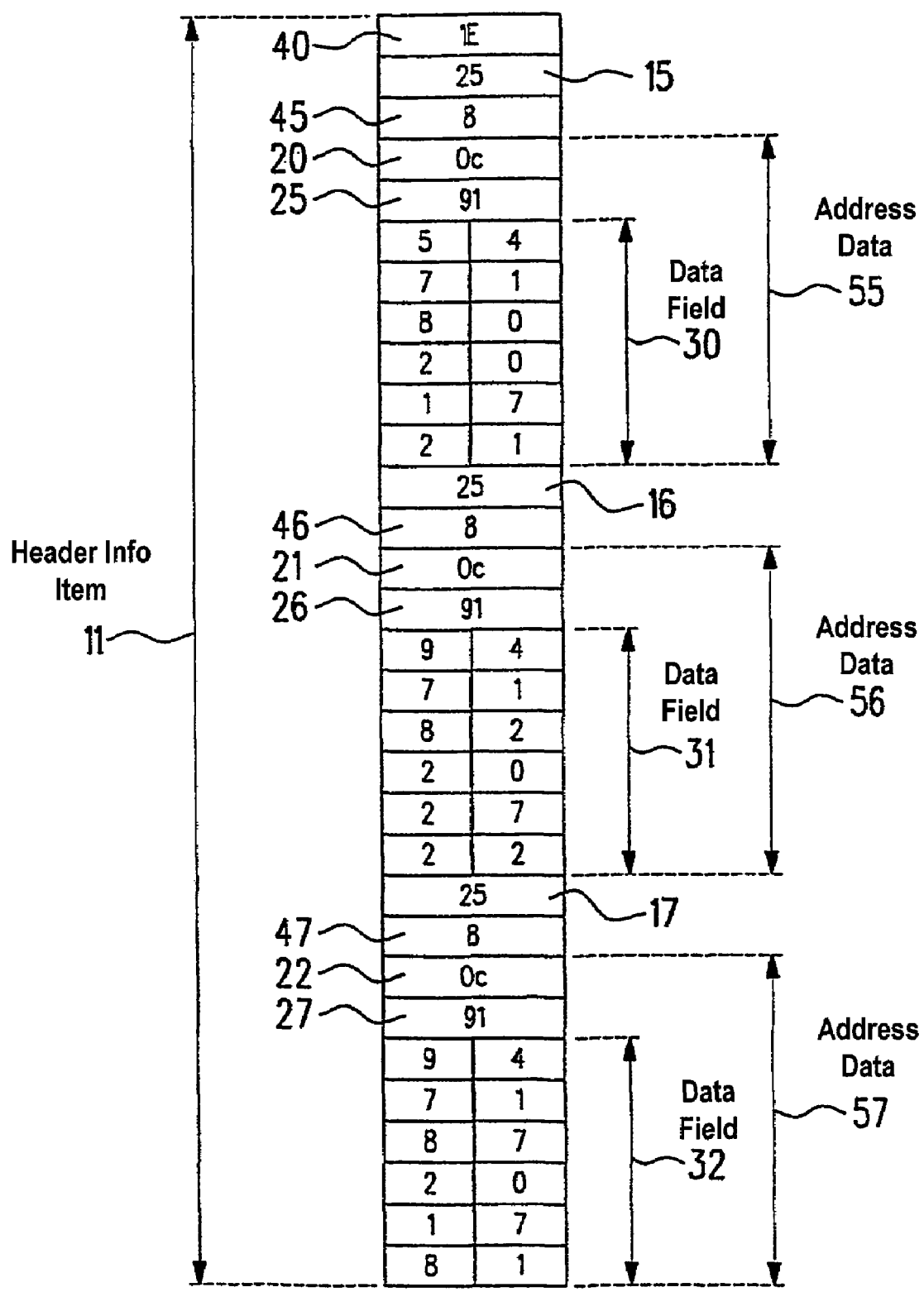
FIG. 4 shows a first exemplary embodiment of the structure of the first header information item in accordance with the teachings of the present invention.

According to FIG. 4, the second length data field 45 is followed by the first data field 20 of the first address data 55 which references the value 0c in the hexadecimal system, and thus a length of the first address data 55 of 12 half-octets or 6 bytes; i.e., a telephone number of 12 digits. The first data field 20 of the first address data 55 is followed by the second data field 25 of the first address data 55 which references the address type of an international directory number according to the ISDN (Integrated Services Data Network) Standard with the value 91 in the hexadecimal system according to the publications "Technical Realisation of the Short Message Service (SMS); Point-to-Point (PP)". The second data field 25 of the first address data 55 is followed by the third data field 30 of the first address data 55 which, in this example, includes the following telephone number as address of the first telecommunication station 175 of the first telecommunication network 100:

+45 170 812 7112.

According to the address type specified in the second data field 25 of the first address data 55, this address is structured as follows, according to FIG. 4: "547180201721".

One digit of the telephone number corresponds to one half-octet; i.e., to a total length of 6 bytes. Thus, the value 8 is obtained for the second length data field 45.

To specify the addresses of further communication stations, use is made of the possibility that the first header information item 11 can contain a number of elements, and thus addresses of a number of communication stations. For the present example, this means that the first address data 55 are followed by a second signaling identification data field 16 with the identifier IEI=25 in the hexadecimal system which thus corresponds to the identifier IEI of the first signaling identification field 15. The second signaling identification data field 16 is then followed by a third length data field 46 which references the length IEIDL=8 like the second length data field 45. The third length data field 46 is then followed by second address data 56. A first data field 21 of the second address data 56 references the value 0c in the hexadecimal system, and thus an address data length of 12 half-octets, as length data field for the second address data 56 and the first data field 20 of the first address data 55. This is followed by a second data field 26 of the second address data 56 which references the value 91 for the type of the address transmitted with the second address data 56 like the second data field 25 of the first address data 55. This is followed by a third data field 31 of the second address data 56 which contains the telephone number:

+49 172 802 7222 as address of the second communication station 176 of the second telecommunication network 200 and is structured as follows according to the type referenced in the second data field 21 of the second address data 56:

"947182202722".

For the case, not shown in FIG. 1, of a third communication station which can be connected to the second network unit 150 via a third telecommunication network and to which the useful data 1 of the short message 5 are also to be transmitted in the form of a short message, the second address data 56 can be followed, according to FIG. 4, by a third signaling identification data field 17 which contains the identifier IEI=25 in the hexadecimal system like the first signaling identification data field 15. The third signaling identification data field 17 is then followed by a fourth length data field 47 which references the length IEIDL=8 in the hexadecimal system like the second length data field 45. This is followed by third address data 57. These include a first data field 22 which references the value 0c in the hexadecimal system as length data field of the third address data 57 like the first data field 20 of the first address data 55. This is followed by a second data field 27 of the third address data 57 which references the value 91 like the second data field 25 of the first address data 55, and thus the same address type as the second data field 25 of the first address data 55. This is followed by a third data field 32 of the third address data 57 which, in the present example, includes the address or, respectively, the telephone number of the third communication station, which is structured as follows:

+49 177 802 7128.

According to the type specified in the second data field 27 of the third address data 57, it is structured as follows:

"947187201781".

The first address data 55, the second address data 56 and the third address data 57 thus correspond to each other in the type of the address or telephone number transmitted with them, and the data volume or length claimed in each case in the first header information item 11.

In the exemplary embodiment described in FIG. 4, the coding of the addresses or of the directory numbers of the communication stations 175, 176 corresponds to the standard described in the said publications "Technical Realisation of the Short Message Service (SMS); Point-to-Point (PP)". Using the signaling identification data fields 15, 16, 17 in the first header information item 11, the second network unit 150 can identify the type of address data 55, 56, 57. Using the length data fields 40, 45, 46, 47 in the first header information item 11, the second network unit 150 can locate the address data 55, 56, 57 in the first header information item 11. Using the first data fields 20, 21, 22 in the first header information item 11, the second network unit 150 can locate the third data fields 30, 31, 32 and thus the telephone numbers of the communication stations in the area of the address data 55, 56, 57. Using the second data fields 25, 26, 27 in the first header information item 11, the second network unit 150 can identify the type of the addresses or telephone numbers stored in the third data fields 30, 31, 32. The second network unit 150 is thus able to extract the addresses or directory numbers stored in the third data fields 30, 31, 32 from the first header information item 11. The second network unit 150 can then form a new short message for each of the communication stations addressed, and copy the telephone number or address extracted for the respective communication station into the second header information item of the newly formed respective short message, this newly formed short message also including the useful data 1 in its data section but in each case only being transmitted to the communication station which is addressed by the respective extracted telephone number in the second header information item 12 of the newly formed short message. A first header information item is not required in a short message newly formed in this manner.

In the exemplary embodiment described according to FIG. 4, two length data fields are, in each case, allocated to the address data 55, 56, 57. The second length data field 45 and the first data field 20 of the first address data 55 are allocated as length data field to the first address data 55. This correspondingly applies to the second address data 56 and the third address data 57. Thus, one of the two length data fields allocated to the respective address data 55, 56, 57 is redundant. To save transmission capacity and to increase the volume of data available for the useful data 1 in the short message 5, the first data fields 20, 21, 22 of the address data 55, 56, 57 can be omitted. The values of the first data fields 20, 21, 22 can then be calculated on the basis of the remaining length data fields 45, 46, 47 in the second network unit 150.

Figure 5:
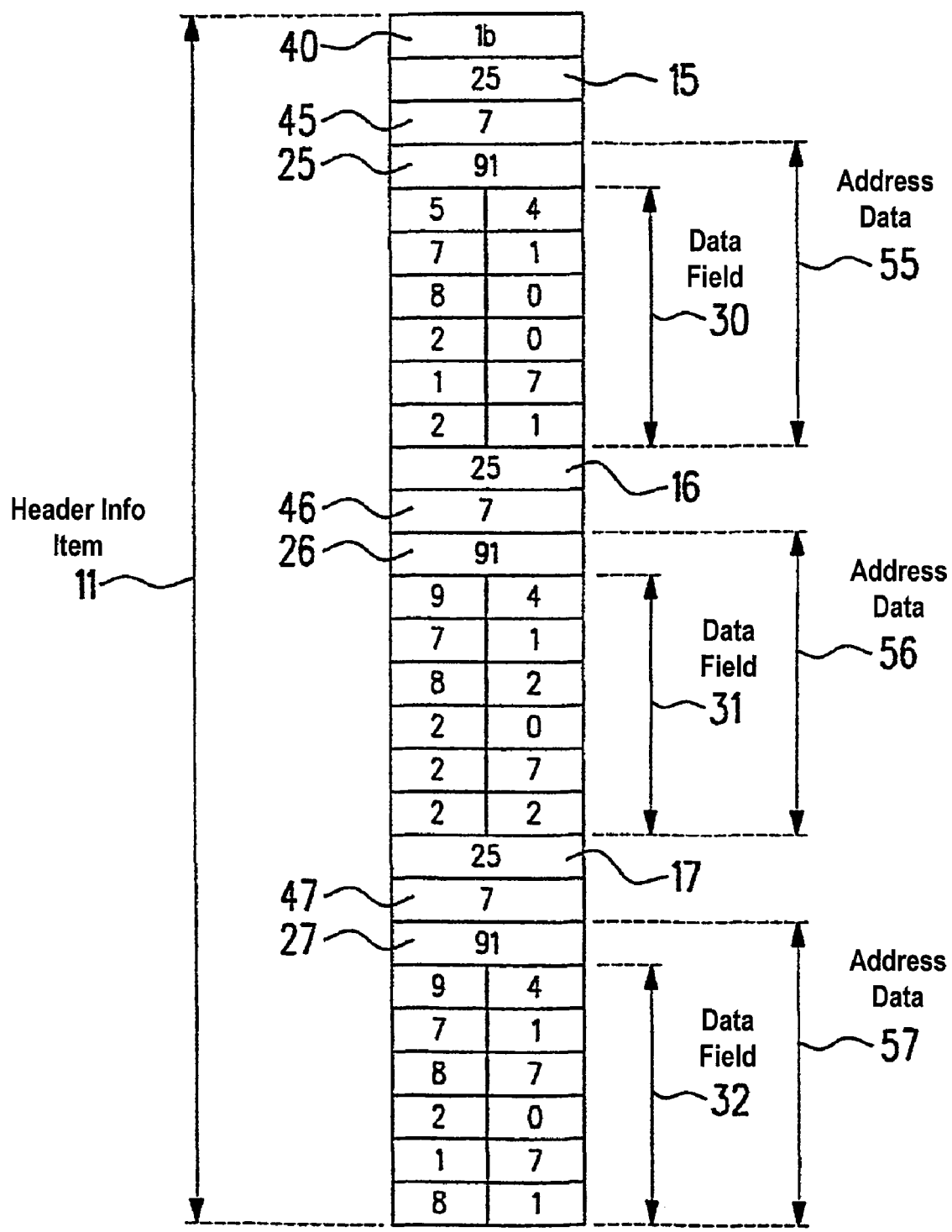
FIG. 5 shows a second exemplary embodiment of the structure of the first header information item.

FIG. 5 shows a second exemplary embodiment of the first header information item 11 in which the first data fields 20, 21, 22 have been omitted and which otherwise corresponds to the first exemplary embodiment according to FIG. 4, the difference being that the first length data field 40 now has the value 1b, reduced by three, for the parameter UDHL and the second length data field 45, the third length data field 46 and the fourth length data field 47 in each case have the value 7, reduced by 1, for the parameter IEIDL. This is due to the fact that in each case the octet for the first data field 20, 21, 22 is saved for the address data 55, 56, 57.

Figure 6:
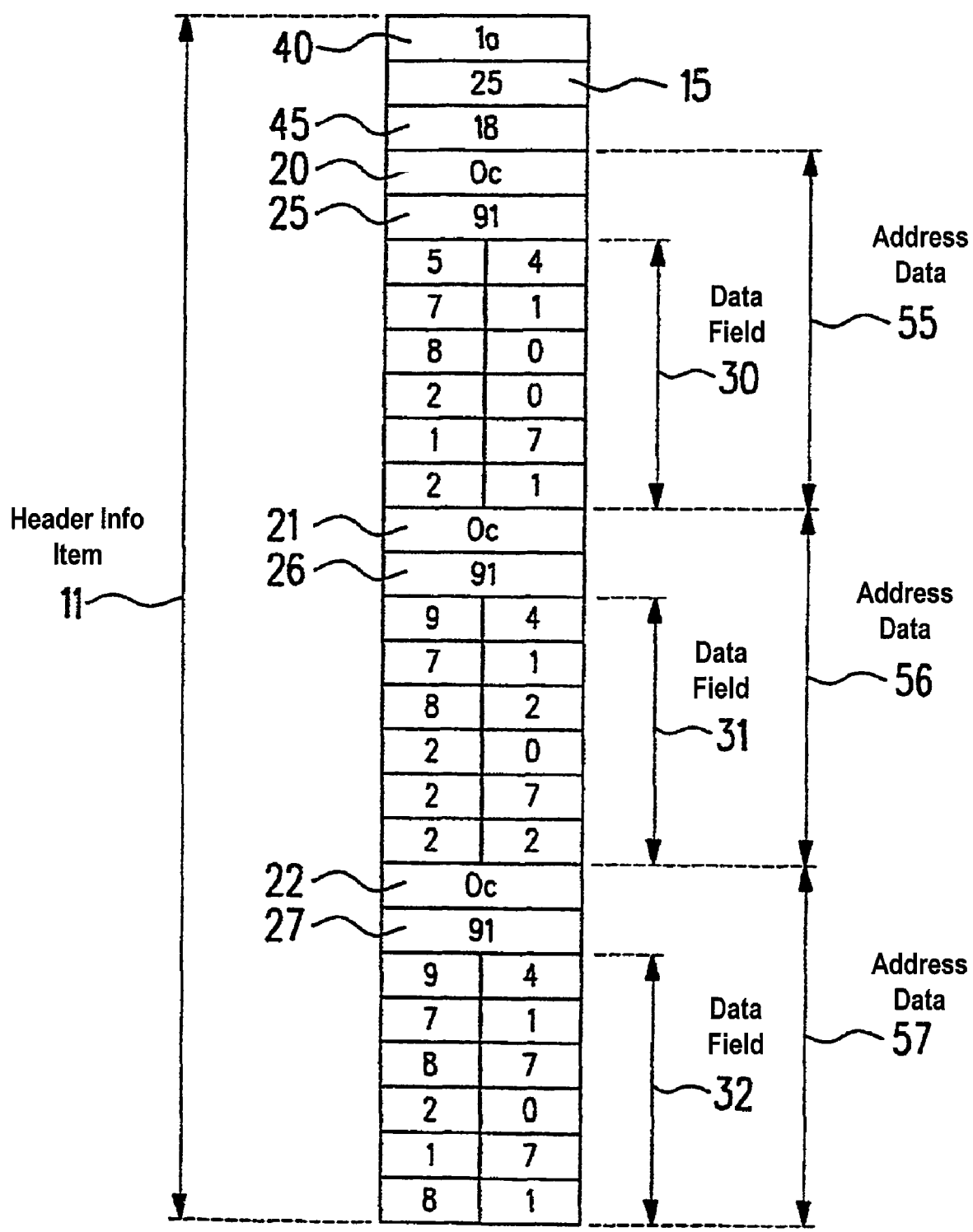
FIG. 6 shows a third exemplary embodiment of the structure of the first header information item.

Both in the first exemplary embodiment according to FIG. 4 and in the second exemplary embodiment according to FIG. 5, in each case an identically named length data field 45, 46, 47 and an identically named signaling identification data field 15, 16, 17 are allocated to the address data 55, 56, 57 so that here, too, there is redundancy and data capacity can be saved in favor of the useful data 1 as is shown by the third exemplary embodiment according to FIG. 6. In this figure, only a single signaling identification data field in the form of the first signaling identification data field 15 is used which follows the first length data field 40. In addition, apart from the first length data field 40, only the second length data field 45 is used which follows the first signaling identification data field 15 and has the value 18 in the hexadecimal system according to FIG. 6. The further length data fields 46, 47 and the further signaling identification data fields 16, 17 can then be omitted, according to FIG. 6, so that the address data 55, 56, 57 follow one another directly and directly adjoin the second length data field 45. In this arrangement, however, the first data field 20, 21, 22 with the value 0c must again be introduced for the address data 55, 56, 57 in order to again ensure that the third data fields 30, 31, 32 can be located in the second network unit 150 since, of course, the third length data field 46 and the fourth length data field 47 have been omitted. Thus, the second length data field 45 now specifies the length of all three address data 55, 56, 57 with the value 18 in the hexadecimal system for the length IEIDL. As can be seen in FIG. 6, the length of the first header information item 11 can be produced again by 1 in this manner since the value UDHL of the first length data field 40 is now 1a in the hexadecimal system.

As described, the first data fields 20, 21, 22 specify the address data length of the address or, respectively, telephone number stored in the respective associated third data field 30, 31, 32. Since the value in the first data fields 20, 21, 22 specifies the number of half-octets, this value must be divided by two in each case in order to obtain the number of octets in the respective third data field 30, 31, 32. If another two octets for the respective data field 20, 21, 22 and the respective second data field 25, 26, 27 are added to the number of octets of the respective third data field 30, 31, 32, the number of octets for the respective address data 55, 56, 57 is obtained. Multiplying this value by three provides the total number of octets for all address data 55, 56, 57 in the first header information item 11. According to FIG. 6, a total of 24 octets, which are referenced by the value 18 in the hexadecimal system for the parameter IEIDL of the second length data field 45, is provided for the address data 55, 56, 57. Due to this known relationship between the value IEIDL in the second length data field 45 and the length values in the first data fields 20, 21, 22, the address data 55, 56, 57 can be separated from one another without problems in the second network unit 150.

To date, it has been assumed that the short message 5, with a number of addresses of communication stations 175, 176 is conducted via the first network unit 140 initially to the second network unit 150 which then evaluates the first header information item 11 and after that distributes the useful data 1 to the communication stations 175, 176 addressed. Even if the two network units 140, 150 can be combined, it is necessary to specify the address of the second network unit 150 as the first destination address in the second header information item 12.

As an alternative, however, it is also possible that the first destination address in the second header information item 12 already represents one of the addresses of the communication stations 175, 176 and all other addresses of the remaining communication stations are specified in the first header information item 11 as in the three exemplary embodiments described. In this case, the first network unit 140 must take over the functions of the second network unit 150 and itself check every arriving short message for the first header information item 11 or, respectively, the signaling identification data fields 15, 16, 17 present there, and extract the addresses of the additionally required communication stations in order to be able to also send the useful data 1 to these with the aid of short messages to be newly formed.

In the exemplary embodiments described, it was assumed that there are three different communication stations, two of which are shown in FIG. 1, and to which the address data 55, 56, 57 in the first header information item 11 are allocated. In the first header information item 11, however, it is also possible to transmit more or less than three address data in the manner described in accordance with one of the three exemplary embodiments. In addition, it can be provided that address data for a communication station of a data network, for example the Internet, are also contained in the first header information item 11, the type of which, naturally, differs from the address data described and must be identified by a corresponding signaling identification data field in the first header information item 11. The address of such a communication station of a data network can then be specified, for example, in the form of an internet address in the associated third data field. The second network unit 150 will then send the useful data 1 to such a communication station as Internet-E-Mail with the extracted internet address if it is connected to such a data network.

Although the present invention has been described with reference to specific embodiments, those of skill in the art will recognize that changes may be made thereto without departing from the spirit and scope of the present invention as set forth in the hereafter appended claims.

The invention claimed is:

1. A device for transmitting data in a telecommunication network to a plurality of communication stations, the data to be transmitted to each for retrieval, the device comprising:
a short message, the short message comprising the data and at least one header information item which includes a variable number of address data fields, wherein each address data field contains the address of one communication station, and wherein the address data fields are capable of storing the addresses of the communication stations in the form of telephone numbers;
a formatting unit for formatting the header information item such that one address data field is available for each communication station of said plurality of communication stations;
a storing unit for storing the addresses of said communication stations in the address data fields; and
a transmitting unit for transmitting the short message to said communication stations according to the addresses stored in the address data fields such that each of the addressed communication stations can retrieve the short message.

2. A method for transmitting data in a telecommunication network, the method comprising:
providing a plurality of communication stations, the data to be transmitted to each communication station for retrieval by each communication station;
providing a short message, the short message comprising the data and at least one header information item which includes a variable number of address data fields, wherein each address data field includes the address of one communication station, and wherein the address data fields are capable of storing the addresses of the communication stations in the form of telephone numbers;
formatting the header information item such that one address data field is available for each communication station of the plurality of communication stations;
storing the addresses of the communication stations in the address data fields; and
transmitting the short message to the communication stations according to the addresses stored in the address data fields such that each of the addressed communication stations can retrieve the short message.

3. A method as claimed in claim 2, whereby the short message further comprises a data section and whereby the method comprises formatting the short message such that the header information item is in the data section.

4. A method as claimed in claim 2, whereby the short message further comprises one second header information item which includes one source address data field and exactly one destination address data field and whereby the method comprises storing in the destination address data field either the address of one of the communication stations or the address of a network unit.

5. A method as claimed in claim 3, whereby the method comprises indicating a presence of the header information item in the short message by a signaling entry in the second header information item.

6. A method as claimed in claim 2, whereby the method comprises further formatting the header information item such that an address identification data field is provided for each address data field specifying the type of the address stored in the address data field.

7. A method as claimed in claim 2, whereby the method comprises extracting during transmission of the short message from the header information item at least one address in order to transmit the data of the short message at least partially with a separate short message to the communication station which is identified by the extracted address.

8. A method as claimed in claim 7, whereby the method comprises the extracting during transmission of the short message from the header information item all addresses and transmitting the data of the short message at least partially with a separate short message to each communication station which is identified by one of the extracted addresses.

9. A method as claimed in claim 2, wherein the telecommunication network is constructed as a GSM mobile radio network.

10. A method as claimed in claim 2, wherein the telecommunication network is constructed as a UMTS mobile radio network.

11. A method as claimed in claim 2, the method further comprising the-step of transmitting, with the first header information item, at least one signaling identification data field which includes the signaling of the data fields.

12. A method as claimed in claim 11, wherein the at least one signaling identification data field specifies a type of address data.

13. A method as claimed in claim 2, wherein the at least one data field is transmitted in a data section of the short message preceding the data of the short message.

14. A method as claimed in claim 2, the method further comprising the step of transmitting, with the first header information item, at least one destination address data field which includes a destination address of the short message.

15. A method as claimed in claim 14, the method further comprising the step of transmitting at least one length data field preceding each destination address data field in the first header information item.

16. A method as claimed in claim 11, wherein for a plurality of destination address data fields, exactly one signaling identification data field is transmitted with the first header information item.

17. A method as claimed in claim 2, wherein
the short message comprises at least one header information item which includes a plurality of address data fields.

18. A device for transmitting a short message in a telecommunication network to a plurality of communication stations, comprising:
a first unit for providing a short message, the short message comprising at least one header information item which includes a variable number of address data fields, wherein each address data field includes the address of one communication station, and wherein the address data fields are capable of storing the addresses of the communication stations in the form of telephone numbers;
a formatting unit for formatting the header information item such that one address data field is available for each communication station of the plurality of communication stations;
a storage unit for storing the addresses of the communication stations in the address data fields; and
a transmitting unit for transmitting the short message to the communication stations according to the addresses stored in the address data fields.

19. A device for transmitting a short message in a telecommunication network to a plurality of communication stations, comprising:
a receiving unit for receiving a short message, the short including at least one header information item which includes a variable number of address data fields, wherein each address data field includes the address of one communication station, and wherein the address data fields are capable of storing the addresses of the communication stations in the form of telephone numbers;
an extracting unit for extracting from the header information item of the short message at least one address; and
a transmitting unit for transmitting the data of the short message at least partially with a separate short message to the communication station which is identified by the extracted address.

* * * * *